(12) United States Patent
Ikeda et al.

(10) Patent No.: US 7,356,094 B1
(45) Date of Patent: Apr. 8, 2008

(54) DIGITAL BROADCAST RECEIVING APPARATUS

(75) Inventors: Yasunari Ikeda, Kanagawa (JP); Toshihisa Hyakudai, Chiba (JP); Takahiro Okada, Saitama (JP); Tamotsu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/936,153

(22) PCT Filed: Mar. 10, 2000

(86) PCT No.: PCT/JP00/01482

§ 371 (c)(1), (2), (4) Date: Jan. 18, 2002

(87) PCT Pub. No.: WO00/54445

PCT Pub. Date: Sep. 14, 2000

(30) Foreign Application Priority Data

Mar. 10, 1999 (JP) .................. 11-063394

(51) Int. Cl.
*H03K 9/00* (2006.01)
*H04L 27/00* (2006.01)

(52) U.S. Cl. .......... 375/316; 375/130; 375/132; 375/133; 375/134; 375/136; 375/137; 375/138; 375/139; 375/140; 375/141; 375/142; 375/143; 375/144; 375/145; 375/147; 375/148; 375/149; 375/150; 375/151; 375/152; 375/153

(58) Field of Classification Search ........ 375/136–137, 375/138–145, 147–153, 242, 259, 260, 262, 375/316, 340, 341, 344, 132–134, 130; 370/203–206, 370/208, 210, 320, 335, 342, 480, 481, 491, 370/319–321, 441–443; 348/725, 726; 714/794, 714/795; 455/150.1–154

See application file for complete search history.

(56) References Cited

U.S. PATENT DOCUMENTS

| | | | | |
|---|---|---|---|---|
| 5,694,389 A | * | 12/1997 | Seki et al. | 370/208 |
| 6,330,293 B1 | * | 12/2001 | Klank et al. | 375/344 |
| 6,470,030 B1 | * | 10/2002 | Park et al. | 370/480 |
| 6,487,252 B1 | * | 11/2002 | Kleider et al. | 375/260 |
| 6,600,776 B1 | * | 7/2003 | Alamouti et al. | 375/147 |

FOREIGN PATENT DOCUMENTS

| | | |
|---|---|---|
| JP | 6-113272 | 4/1994 |
| JP | 411145929 A * | 5/1999 |
| JP | 2000-101543 | 4/2000 |
| JP | 2000-115119 | 4/2000 |
| WO | WO 99/01956 | 1/1999 |

* cited by examiner

*Primary Examiner*—Curtis Odom
(74) *Attorney, Agent, or Firm*—Finnegan, Henderson, Farabow, Garrett & Dunner, L.L.P.

(57) ABSTRACT

A digital broadcast receiving apparatus for receiving a broadcast signal generated by combining sub signals modulated using a random sequence generated based on an initial value set in accordance with a frequency of a broadcast channel by a signal transmission control use signal and a main signal generated based on information source data and reproducing the information source data contained in the received broadcast signal.

16 Claims, 6 Drawing Sheets

PHASES OF
CP,SP,TMCC,AC1,AND AC2
ARE RANDOM IN SEGMENTS

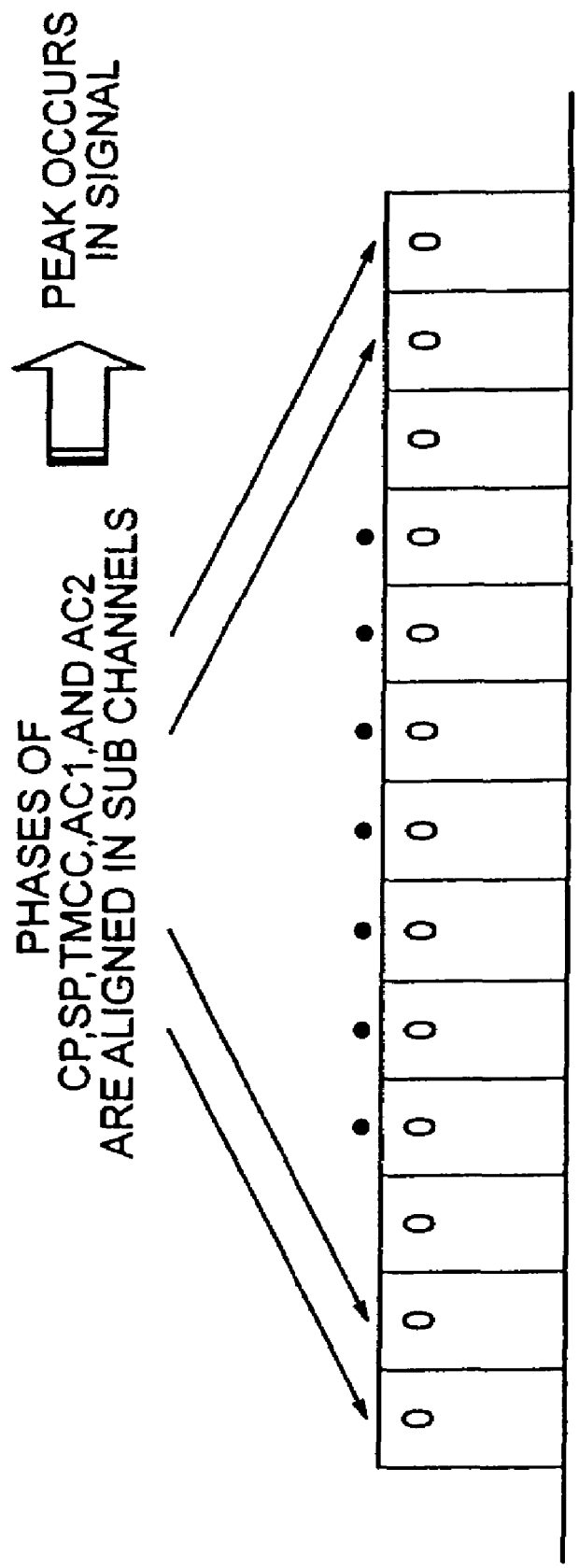

1

DIGITAL BROADCAST RECEIVING APPARATUS

TECHNICAL FIELD

The present invention relates to a digital broadcast receiving apparatus for receiving a broadcast signal in a digital broadcast, particularly in a digital sound broadcast.

BACKGROUND ART

As a provisional system of terrestrial digital television broadcasts and digital terrestrial sound broadcasts, the broadcast systems referred to as the wideband ISDB-T system and narrowband ISDB-T system have been proposed. These broadcast systems are systems having mutual compatibility, construct OFDM (orthogonal frequency division multiplexing) modulated basic transmission unit referred to as "segment" in a bandwidth (about 429 kHz) obtained by dividing the frequency band of 6 MHZ allocated to television channels in Japan into 14, and use the segments for digital terrestrial television broadcasts or digital terrestrial sound broadcasts.

The signal of the segments is OFDM modulated. As the number of OFDM carriers of a segment, three modes of 108, 216, and 432 are defined. In digital terrestrial television, the transmission signal is comprised by using 13 segments, but in digital terrestrial sound broadcasts, it is determined by the provisional system that the transmission signal be comprised using one segment or three segments.

The OFDM carriers in a segment are modulated by an identical modulation scheme. As the modulation scheme, DQPSK, QPSK, 16QAM, 64QAM, etc. are defined. Carriers in a segment include not only carriers transmitting information, also various types of pilot signals, a transmission control signal, etc. As the pilot signals, there are a CP (continual pilot) and SP (scattered pilot), while as the transmission control signal, there is a TMCC (transmission and multiplexing configuration control) signal. Also, as additional information, there are signals such as AC1 (auxiliary channel 1) and AC2 (auxiliary channel 2). The CP and SP among the pilot signals are BPSK (binary phase shift keying) modulated by a PRBS (pseudo-random binary sequence) output corresponding to the carrier number. Also, the additional information AC1 and AC2 are BPSK modulated in the OFDM symbol in a frame header by the output of the PRBS corresponding to the carrier number similar to the pilot signals CP and SP, but are differentially BPSK modulated in the following OFDM symbols by the additional information to be transmitted with reference to the phases of the additional information AC1 and AC2 in the OFDM symbol in the header of the frame. Also, the transmission control signal TMCC is BPSK modulated in the OFDM symbol in the frame header by the PRBS output corresponding to the carrier number similar to the additional information AC1 and AC2, but is differentially BPSK modulated in the following OFDM symbols based on the information of the transmission control signal TMCC with reference to the phase in the OFDM symbol in the frame header.

In the wideband ISDB-T system, a signal is comprised by 13 segments, but while PRBS using the same generator polynomial is used, the system is set so that the initial value given to the circuit generating the PRBS differs according to the number of each segment and is configured so that there is no contradiction in phases of pilot signals CP at the upper ends and lower ends of adjoining segments. The initial value given to the circuit for generating the PRBS is made different according to the location of the segment in this way for the purpose of randomizing the phases of the pilot signals CP and SP in each segment as much as possible so as to prevent a peak from occurring in the wideband ISDB-T signal and reduce a dynamic range of the signal.

FIG. 5 shows the configuration of a segment of a digital terrestrial television broadcast system, that is, the wideband ISDB-T system, and the phases (represented by the number in each block) of the various types of pilot signals CP and SP, transmission control signal TMCC, and additional information AC1 and AC2. Note the phases (and representative numbers) can be contrasted with those in a narrowband ISDB-T signal as shown in FIG. 6.

As illustrated, in the wideband ISDB-T system, the phases of the pilot signals CP and SP, transmission control signal TMCC, and additional information AC1 and AC2 in each segment are controlled to be random. For this reason, the occurrence of a peak in a signal of the wideband ISDB-T system can be prevented and demand on the dynamic range of the receiver can be eased.

According to the above digital terrestrial television and sound broadcast systems, the frequency bands used for the broadcasts will be the frequency bands of analog type terrestrial television broadcasts being actually broadcast at present. For example, the UHF band allocated to television broadcasts at present is scheduled to be used as the frequency band for digital terrestrial television broadcasts, while the VHF band allocated to television broadcasts at present is scheduled to be used as the frequency band for digital terrestrial sound broadcasts. For this reason, it is considered that in the VHF band allocated to digital terrestrial sound broadcasts, at least the present channel structure will not change until analog television broadcasts shift to digital. Namely, in digital terrestrial broadcasts as well, the broadcast service will be started based on the present television channels. Due to this, it is considered that in digital terrestrial sound broadcasts, signals will be configured based on 6 MHZ (4 MHZ).

In the narrowband ISDB-T system used in digital terrestrial sound broadcasts, signals of a one-segment format and three-segment format are defined. Due to this, there is only one segment number in the one-segment format and only three in the three-segment format. FIG. 6 shows the segment configuration of a narrowband ISDB-T signal and the phase relationships of the various types of pilot signals. As illustrated, when all of the signals in a channel are one-segment signals, all of the 13 segment numbers become identical, therefore if the initial value given to the circuit for generating the PRBS is set in accordance with the segment number, the initial values become identical and consequently the phases of the pilot signals CP and SP of all of the 13 segments become identical. Also, the transmission control signal TMCC and the additional information AC1 and AC2 at the time of no modulation similarly become the identical phase in all of 13 segments. For this reason, when viewing the overall signals in the channel, there are a large number of groups of carriers having aligned phases, therefore the probability of occurrence of peaks in the transmission signal becomes high and there is a disadvantage that it becomes difficult to secure the dynamic range of a front end amplifier in the receiver.

Therefore, when transmitting a narrowband ISDB-T signal, it can be considered to control the phase of the carrier depending upon the frequency position in each transmission channel so as to suppress an increase of the dynamic range of the broadcast signal. For example, one may modulate sub signals such as pilot signals and transmission control signal by using the PRBS generated by using the initial value set in accordance with the frequency position of the broadcast channel and for example OFDM modulate the modulated signals together with the encoded main signal to thereby generate a broadcast signal. By employing this method, the system is set so that the phases of the main signal and sub signal carriers for the different channel are different, so the dynamic range of the broadcast signal can be suppressed and the demands on the dynamic range of the front end amplifier in the receiver can be eased.

Corresponding to the above broadcast apparatus, in a digital broadcast receiving apparatus, unless signal processing corresponding to the signal processing performed at the broadcast apparatus side can be suitably carried out with respect to the received broadcast signal, information source data contained in the encoded main signal cannot be correctly reproduced or the sub signals no longer can be correctly reproduced, whereby there arise disadvantages that the control information contained in the transmission control signal cannot be correctly taken out and it becomes impossible to correctly receive the digital broadcast.

DISCLOSURE THE INVENTION

The present invention was made in consideration with such a circumstance and has as an object thereof to provide a digital broadcast receiving apparatus performing processing corresponding to the signal processing performed on the broadcast side with respect to a received signal of a digital terrestrial broadcast and capable of correctly reproducing the information source data contained in the broadcast signal.

To attain the above object, a digital broadcast receiving apparatus of the present invention is a digital broadcast receiving apparatus for receiving a broadcast signal generated by combining sub signals modulated using a random sequence generated based on an initial value set in accordance with a frequency of a broadcast channel by a signal transmission control use signal and a main signal generated based on information source data and reproducing the information source data contained in the received broadcast signal, having a demultiplexing circuit for demultiplexing the main signal and sub signals in the received signal, a random sequence generating circuit for generating a PRBS based on the initial value set in accordance with the frequency of the broadcast channel, a sub signal reproduction circuit for reproducing the demultiplexed sub signals using the PRBS, a control circuit for controlling the reproduction of the main signal in accordance with the reproduced sub signals, and a decoding circuit for decoding the main signal under the control of the control circuit.

Also, a digital broadcast receiving apparatus of the present invention is a digital broadcast receiving apparatus for receiving a broadcast signal generated by combining a main signal comprised of a data series generated in accordance with information source data interleaved and encoded using a parameter set in accordance with a frequency of a broadcast channel and sub signals comprised of a signal transmission control use signals modulated using a predetermined random sequence and for reproducing the information source data contained in the received broadcast signal, having a demultiplexing circuit for demultiplexing the main signal and sub signals in the received signal, a deinterleaving circuit for deinterleaving the demultiplexed main signal using a parameter set in accordance with the frequency of the broadcast channel, and a decoding circuit for decoding the deinterleaved signal.

Also, in the present invention, preferably the parameter used for the interleaving on the transmission side is set in accordance with the broadcast channel, and a control circuit for setting the parameter in the deinterleaving circuit in accordance with the received broadcast channel is further provided.

Also, in the present invention, preferably, pilot signals are contained in the sub signals, a correction circuit for correcting a distortion occurring in the main signal in accordance with a difference of the pilot signals detected by using the PRBS is provided, a transmission control signal is contained in the sub signals, and the control circuit controls the operation of the decoding circuit in accordance with the transmission control signal reproduced by using the pseudo random sequence.

Further, in the present invention, the decoding circuit has a channel selection control circuit for decoding, including correcting error in the signal deinterleaved by the deinterleaving circuit, outputting an error signal when the error correction becomes disabled in accordance with the state of the received signal, terminating reception of a channel being recepted when receiving the error signal, and receiving another channel. Further, at the preset of the broadcast channel, the channel selection control circuit sequentially receives all broadcast channels for which the error signal is not output from the decoding circuit.

According to the digital broadcast receiving apparatus of the present invention, the transmission control use signals modulated by using the PRBS in a digital broadcast signal, for example, the pilot signals CP and SP and the transmission control signal TMCC, are reproduced by using the PRBS generated depending upon the frequency of the channel to be received or the channel number or sub channel number. Based on these reproduced transmission control use signals, distortion occurring in the carrier of the main signal in for example a channel is corrected and the information source data contained in the main signal is reproduced.

Also, in the received broadcast signal, when the main signal containing the information source data is interleaved and encoded by a parameter in accordance with the frequency of the broadcast channel, the main signal containing the information source data is deinterleaved using a parameter set based on the frequency of the channel to be received or channel number or sub channel number, then is decoded, including corrected for error, to reproduce the information source data. When the error correction is disabled in accordance with the state of the received signal, an error signal is output from the decoding circuit, therefore, by detecting existence of the related error signal, automatic channel selection and the presetting of the reception channel in the receiving apparatus become possible.

BRIEF DESCRIPTION OF THE DRAWINGS

FIG. 6 is a view of a sub channel structure in the narrowband ISDB-T broadcast system and phases of pilot signals etc. in a sub channel.

BEST MODE FOR WORKING THE INVENTION

The digital broadcast receiving apparatus of the present invention performs signal processing on a received broadcast signal corresponding to various signal processing performed at the broadcast side to correctly reproduce the information source data contained in the received signal. Below, an explanation will be made of embodiments of the present invention after first explaining a digital broadcast apparatus.

Digital Broadcast Apparatus

Figure 1:
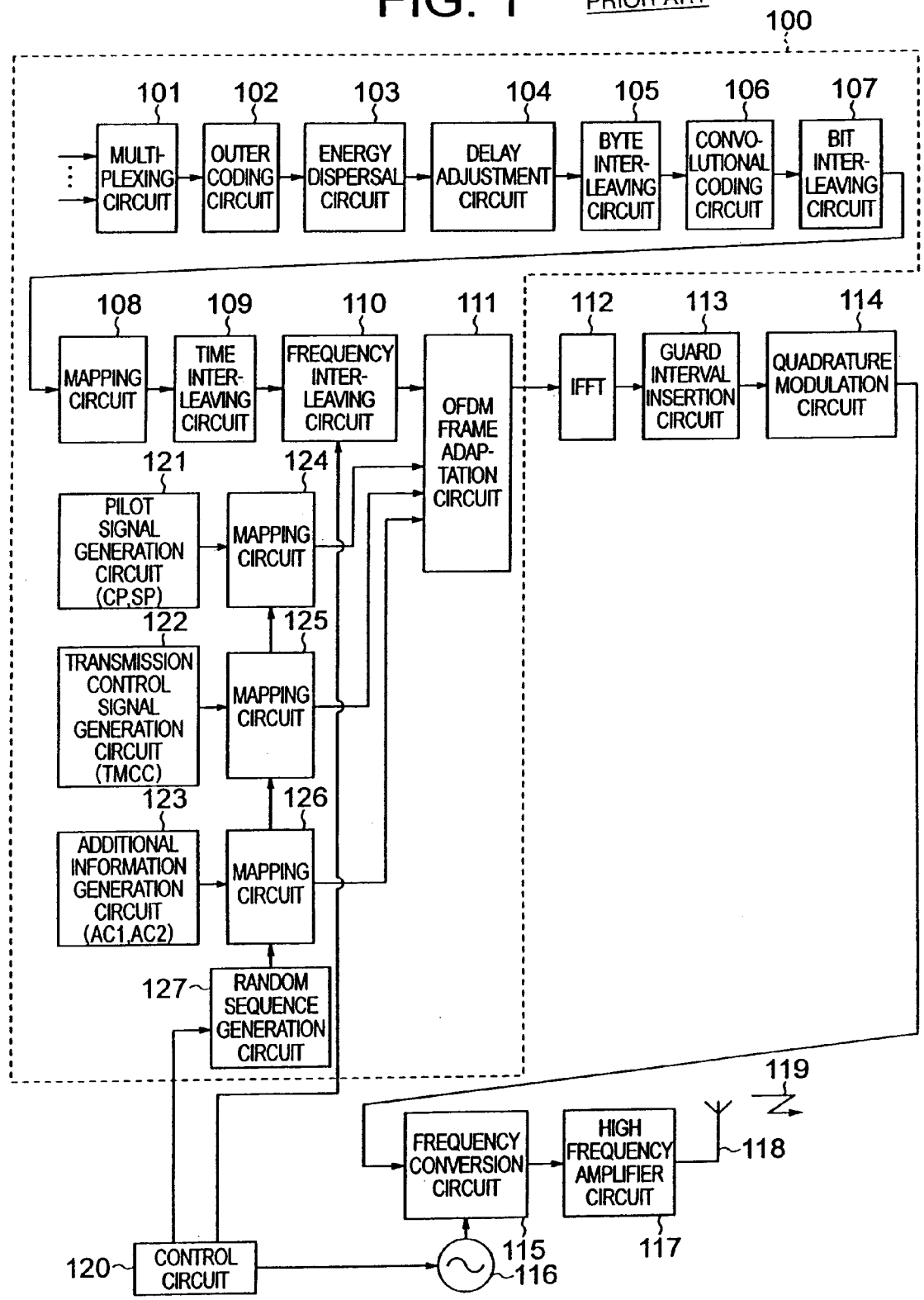
FIG. 1 is a circuit diagram of an example of the configuration of a digital broadcast apparatus.

FIG. 1 is a circuit diagram of an example of the configuration of a digital broadcast apparatus.

As illustrated, the digital broadcast apparatus is comprised by a broadcast signal processing circuit 100 for processing one segment of the broadcast signal, inverse Fourier transform circuit (IFFT) 112, guard interval insertion circuit 113, quadrature modulation circuit 114, frequency conversion circuit 115, RF (radio frequency) signal oscillation circuit 116, high frequency amplifier circuit 117, transmission antenna 118, and control circuit 120.

The broadcast signal processing circuit 100 is comprised by, as illustrated, a multiplexing circuit 101, outer coding circuit 102, energy dispersal circuit 103, delay adjustment circuit 104, byte interleaving circuit 105, convolutional coding circuit 106, bit interleaving circuit 107, mapping circuit 108, time interleaving circuit 109, frequency interleaving circuit 110, OFDM frame adaptation circuit 111, pilot signal generation circuit 121, transmission control signal generation circuit 122, additional information generation circuit 123, mapping circuits 124, 125, and 126, and random sequence generation circuit 127.

The multiplexing circuit 101 generates a so-called transport stream (TS) obtained by multiplexing a plurality of source coded bit streams comprised by for example digital sound signals in a time division manner.

The outer coding circuit 102 receives the bit stream multiplexed by the multiplexing circuit 101 and performs outer coding for the bit stream by Reed Solomon encoding.

The energy dispersal circuit 103 randomizes the information of the bit stream encoded by the outer coding circuit 102 to disperse the energy.

The delay adjustment circuit 104 adjusts the randomized bit stream in terms of delay time.

The byte interleaving circuit 105 convolutionally interleaves the data output by the delay adjustment circuit 104 for dispersing remaining error of the convolutional codes.

The convolutional coding circuit 106 convolutionally encodes the output signal of the byte interleaving circuit 105.

The bit interleaving circuit 107 interleaves the bits of the output signal of the convolutional coding circuit 106 and outputs the obtained data to the mapping circuit 108.

The mapping circuit 108 performs mapping for modulation of the OFDM modulation use carriers according to the input data series. Specifically, for example, the mapping circuit 108 allocates signal points of the OFDM carriers and outputs the processed signal to the time interleaving circuit 109.

The time interleaving circuit 109 interleaves the output signal of the mapping circuit 108 on a time axis and outputs the output signal to the frequency interleaving circuit 110.

The frequency interleaving circuit 110 further interleaves the time interleaved signal on a frequency axis and supplies the output signal to the OFDM frame adaptation circuit 111. Note that, in the present embodiment, the parameter in the frequency interleaving circuit 110 is controlled by a control circuit 120 in accordance with the broadcast frequency.

The pilot signal generation circuit 121 generates the pilot signals CP, SP, etc. Then, the transmission control signal generation circuit 122 generates the transmission control signal TMCC, and the additional information circuit 123 generates the additional information AC1, AC2, etc.

The mapping circuit 124 performs mapping for modulating the OFDM carriers in accordance with the pilot signals CP and SP, the mapping circuit 125 performs mapping for modulating the OFDM carriers in accordance with the transmission control signal TMCC, and further the mapping circuit 126 performs mapping for modulating the OFDM carriers in accordance with the additional information AC1 and AC2. Then, the output signals of C these mapping circuits are all output to the OFDM frame adaptation circuit 111.

The random sequence generation circuit 127 generates the PRBS and supplies the same to the mapping circuits 124, 125, and 126. At the random sequence generation circuit 127, the initial value of the random number code used for generating the PRBS is set by the control circuit 120.

The OFDM frame adaptation circuit 111 receives the data series output from the frequency interleaving circuit 110 and the mapping circuits 124, 125, and 126, allocates the predetermined carriers to the data series output by the frequency interleaving circuit 110, and further allocates the mapped pilot signals CP and SP, transmission control signal TMCC, and the additional information AC1 and AC2 as special OFDM carriers to thereby build the frame.

The inverse Fourier transform circuit 112 performs an inverse discrete Fourier transform on the output signal of the broadcast signal processing circuit 100. the output signal of the broadcast signal processing circuit 100 is a signal obtained by the OFDM modulation and a signal obtained by adding a plurality of carriers modulated by a plurality of digital signals to each other. In the inverse Fourier transform circuit 112, one inverse discrete Fourier transform is carried out for every transmission symbol duration with respect to the related OFDM modulated wave. As a result, a transmission signal on the time axis is obtained.

The guard interval insertion circuit 113 adds a guard interval duration to the transmission signal obtained by the inverse Fourier transform. The related guard interval duration is a signal period added for reducing the influence of the multi-path phenomenon (ghost) at the receiver. Usually, a guard interval duration is generated by repeating a signal waveform of a effective symbol duration for transmitting actual information. Note that the transmission symbol duration of OFDM is comprised by the guard interval duration and the effective symbol duration added together.

The quadrature modulation circuit 114 quadrature modulates the signal output by the guard interval insertion circuit 113 and outputs the quadrature modulated signal.

The frequency conversion circuit 115 converts the frequency of the output signal of the quadrature modulation circuit 114 by using the RF oscillation signal from the RF signal oscillation circuit 116. The carrier of the transmission signal is converted to a broadcast use high frequency band by the related frequency conversion.

The high frequency amplifier circuit 117 amplifies the high frequency signal output by the frequency conversion circuit 115 and outputs the amplified signal to the transmission antenna 118.

The transmission antenna 118 broadcasts the high frequency signal amplified by the high frequency amplifier circuit 117 into space.

The control circuit 120 controls the operation of the frequency interleaving circuit 110 and the random sequence generation circuit 127 in the broadcast signal processing circuit 100 and further controls the oscillation frequency of the RF signal oscillation circuit 116. For example, the control circuit 120 sets the parameter in the frequency interleaving circuit 110 in accordance with the frequency of the RF signal and sets the initial value of the random number code in the random sequence generation circuit 127.

Below, an explanation will be made of the operation of the digital broadcast apparatus by referring to FIG. 1.

A plurality of source coded bit streams obtained by digitizing and encoding the broadcast signal are multiplexed by the multiplexing circuit 101 in a time division manner to generate a transport stream. This transport stream is outer coded based on for example Reed Solomon (RS) encoding and is randomized by the energy dispersal circuit 103. The randomized data is corrected by the delay adjustment circuit 104, then is convolutionally interleaved in the byte interleaving circuit 105 for the purpose of dispersal of the remaining error of the convolutional code and is convolutionally encoded by the convolutional coding circuit 106. The convolutionally encoded output is bit interleaved by the bit interleaving circuit 107, and the data series obtained by the related bit interleaving is supplied to the mapping circuit 108 for modulating the OFDM carriers.

The mapping circuit 108 allocates the signal points of the OFDM carriers and further sequentially supplies the outputs thereof to the time interleaving circuit 109 and the frequency interleaving circuit 110. the output of the frequency interleaving circuit 110 is supplied to the OFDM frame adaptation circuit 111. Further, the pilot signals CP and SP generated by the pilot signal generation circuit 121, the transmission control signal TMCC generated by the transmission control signal generation circuit 122, and the additional information AC1 and AC2 generated by the additional information generation circuit 123 are mapped by the mapping circuits 124, 125, and 126 and supplied to the OFDM frame adaptation circuit 111. This OFDM frame adaptation circuit 111 is allocated these pilot signals, transmission control signal, and additional information as special OFDM carriers and builds a frame.

The output of the frame adaptation circuit 111 is supplied to the inverse Fourier transform circuit 112 and converted from a signal of the frequency domain to a signal of the time domain by the inverse Fourier transform. Further, the guard interval insertion circuit 113 adds the required guard interval duration, then the quadrature modulation circuit 114 quadrature modulates the result to a real portion and an imaginary portion and outputs a signal of an intermediate frequency. The OFDM modulated signal of the related intermediate frequency band is converted to the required transmission frequency (RF band) by the frequency conversion circuit 115 and the RF signal oscillation circuit 116, then the OFDM modulated signal of this RF band is amplified by the high frequency amplifier circuit 117 and then emitted from the transmission antenna 118 as an RF output signal 119.

The control circuit 120 controls the RF signal oscillation circuit 116 and, at the same time, controls the random sequence generation circuit 127 so as to change the initial value for generating the PRBS according to the frequency of the RF output signal 119. Specifically, the initial value set in the random sequence generation circuit 127 is changed in accordance with the center sub channel number of the sub channels comprising the segments. Note that, the sub channel number will be explained later. The random sequence generation circuit 127 generates the PRBS according to a predetermined generator polynomial based on the set initial value. The pilot carriers are BPSK modulated by values of the PRBS corresponding to the frequency positions (carrier numbers) of CP and SP. In the carriers of the transmission control signal TMCC and the additional information AC1 and AC2, the carrier phases of the frame header OFDM symbol are PBSK modulated by the values of PRBS corresponding to the frequency positions (carrier numbers) thereof. Note that, in the following symbols, the carriers of the transmission control signal TMCC and the additional information AC1 and AC2 are differentially BPSK modulated by the transmission control signal and the additional information with reference to the phase of the frame header symbol. Also, according to need, the control circuit 120 outputs a control signal to the frequency interleaving circuit 110 to set the parameter of the interleaving in a segment in the interleaving circuit in accordance with the sub channel number of the RF output signal 119.

Here, an explanation will be made of the sub channel and sub channel number. Sub channels are virtual channels of a bandwidth of ⅐ MHZ and are sequentially numbered in a direction from a low frequency to high frequency within a 6 MHZ bandwidth corresponding to the bandwidth of current television channels. Specifically, they are sequentially numbered so that the sub channel using the lowest end frequency of the current television channels having a 6 MHZ bandwidth as the center frequency is given a sub channel number 0, a sub channel using a frequency higher than the center frequency of the sub channel of the sub channel number 0 by ⅐ MHZ as the center frequency is given a sub channel number 1, and a sub channel using a frequency higher than the center frequency of the sub channel of the sub channel number 1 by ⅐ MHZ as the center frequency is given a sub channel number 2.

By the above broadcast apparatus, a digital terrestrial sound broadcast signal of the narrowband ISDB-T system is generated. The dynamic range of the related generated broadcast signal can be kept low, so the demands on the input dynamic range of the front end receiver in the receiving apparatus can be eased.

Below, an explanation will be made of embodiments of the digital broadcast receiving apparatus of the present invention.

FIRST EMBODIMENT

Figure 2:
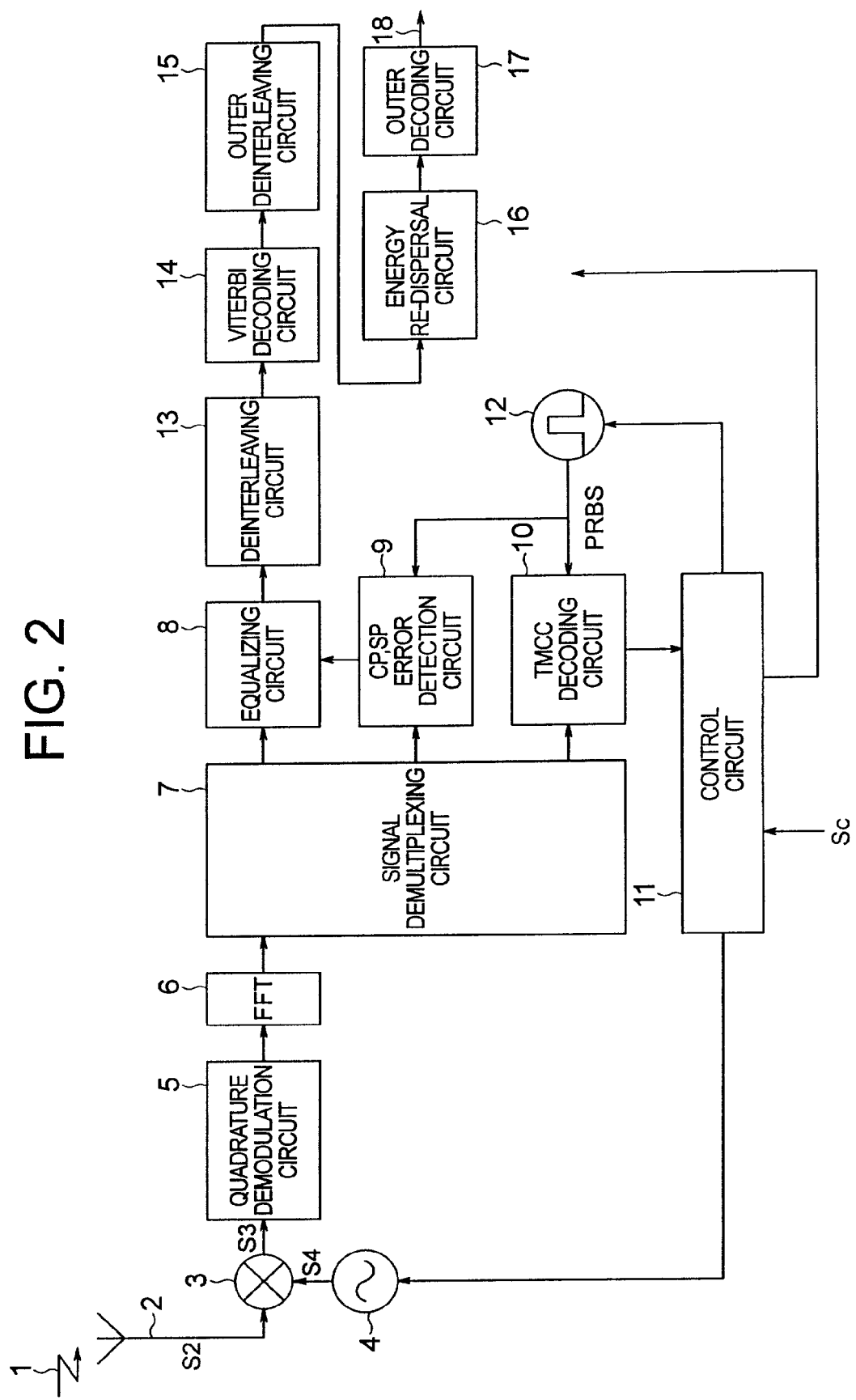
FIG. 2 is a circuit diagram of a first embodiment of a digital broadcast receiving apparatus according to the present invention.

FIG. 2 is a circuit diagram of a first embodiment of a digital broadcast receiving apparatus according to the present invention. As illustrated, the receiving apparatus of the present embodiment is comprised by a receiving antenna 2, frequency conversion circuit 3, local oscillation circuit 4, quadrature demodulation circuit 5, Fourier transform circuit (FFT) 6, signal demultiplexing circuit 7, equalizing circuit 8, pilot signal error detection circuit (CP, SP error detection circuit) 9, transmission control signal decoding circuit (TMCC decoding circuit) 10, control circuit 11, random sequence (PRBS: pseudo-random binary sequence) generation circuit 12, deinterleaving circuit 13, Viterbi decoding circuit 14, outer deinterleaving circuit 15, energy re-dispersal circuit 16, and outer decoding circuit 17.

The receiving antenna 2 acquires a high frequency broadcast radio signal 1 broadcast into space by the broadcast apparatus and supplies a received broadcast signal S2 to the frequency conversion circuit 3.

The frequency conversion circuit 3 is comprised by for example a mixer, converts the frequency of the broadcast signal S2 received by the antenna 2 to the intermediate frequency of the difference between the original received frequency and the frequency of a local oscillation signal S4 generated by the local oscillation circuit 4, generates an intermediate frequency signal S3, and outputs the same to the quadrature modulation circuit 5.

The quadrature demodulation circuit 5 quadrature demodulates the intermediate frequency signal S3 and outputs the demodulated signal to the Fourier transform circuit 6.

The Fourier transform circuit 6 performs a Fourier transform on the demodulated signal from the quadrature demodulation circuit 5 and supplies the result of the Fourier transform to the signal demultiplexing circuit 7. By the related Fourier transform, the amplitudes and phases of carriers of the OFDM modulated signal are demodulated together.

The signal demultiplexing circuit 7 demultiplexes the OFDM carrier demodulated by the Fourier transform circuit 6 to the information transmission use carrier, pilot signal (CP, SP) use carrier, and transmission control signal (TMCC) use carrier and outputs them to the equalizing circuit 8, pilot signal error detection circuit 9, and transmission control signal decoding circuit 10.

The random sequence generation circuit 12 generates a PRBS by using a generator polynomial the same as that on the transmission side based on the initial value set by the control circuit 11 and supplies the generated PRBS to the pilot error detection circuit 9 and the transmission control signal decoding circuit 10.

Here, the PRBS generation use initial value set by the control circuit 11 is controlled in accordance with the sub channel number. The transmission side of the digital broadcast generates the PRBS determining the carrier phases and amplitudes of the pilot signals CP and SP and the transmission control signal TMCC based on the initial value controlled in accordance with the number of the sub channel as mentioned above, therefore by having the reception side generate a PRBS based on an initial value controlled in accordance with the sub channel number, the amplitudes and phases of the pilot signals CP and SP and transmission control signal TMCC originally being transmitted can be learned from the values corresponding to the carrier numbers of the PRBS. For this reason, the error detection of the pilot signals CP and SP and the decoding of the transmission control signal TMCC supplied from the signal demultiplexing circuit 7 can be realized. The pilot error detection circuit 9 detects the error of the pilot signals by extracting differences between the amplitudes and phases of the pilot signals CP and SP demultiplexed by the signal demultiplexing circuit 7 and the amplitudes and phases of the PRBS based on the PRBS supplied from the random sequence generation circuit 12. The detected error of the pilot signals is supplied to the equalizing circuit 8, which corrects the amplitudes and phases of the OFDM carriers distorted in the channel.

Similarly, the transmission control signal decoding circuit 10 can find the reference phase of the carrier of the transmission control signal TMCC based on the PRBS generated by the random sequence generation circuit 12 and decode the information of the transmission control signal TMCC transmitted by differential modulation of the related reference phase. The information of the transmission control signal TMCC decoded by the transmission control signal decoding circuit 10 is supplied to the control circuit 11.

The control circuit 11 generates the necessary control signals based on the transmission control signal TMCC decoded by the transmission control signal decoding circuit 10 and supplies the same to the partial circuits of the receiving apparatus. Usually, as the control circuit 11, frequent use is made of a microcomputer. In the receiving apparatus of the present embodiment, the channel is selected by designating the number of the current television channel and the number of the sub channel. The control circuit 11 generates a control signal for generating the local oscillation signal S4 having an intended oscillation frequency in accordance with channel selection information $S_C$ comprised by the input number of the current television channel and sub channel number and outputs the same to the local oscillation circuit 4. Further, based on the sub channel number of the input channel selection information $S_C$, the initial value for generating the PRBS in the random sequence generation circuit 12 is determined. For example, the initial value for generating the PRBS is stored in a memory or the like as a table in the program of the microcomputer, and the initial value for generating the random sequence corresponding to the sub channel number of the channel selection information $S_C$ is read out from the memory and supplied to the random sequence generation circuit 12.

The deinterleaving circuit 13 performs processing inverse to the interleaving performed on the transmission side, for example, frequency interleaving. Here, the deinterleaving circuit 13 deinterleaves the related carrier upon receipt of the information transmission use carrier corrected for distortion by the equalizing circuit 8 and supplies the result of processing to the Viterbi decoding circuit 14.

The Viterbi decoding circuit 14 decodes the input signal. Then, the Viterbi decoded signal is outer deinterleaved by the outer deinterleaving circuit 15, and the result thereof is output to the energy re-dispersal circuit 16. Note that, here, the outer deinterleaving circuit corresponds to the byte interleaving circuit on the transmission side and performs processing inverse to the byte interleaving.

The energy re-dispersal circuit 16 performs processing inverse to the energy dispersal carried out on the transmission side with respect to the input signal and outputs the result to the outer decoding circuit 17.

The outer decoding circuit 17 decodes the input signal by for example Reed Solomon decoding. As a result of the related decoding, the original information source data on the transmission side is restored, so for example an audio signal can be reproduced in accordance with the related information source data.

Below, an explanation will be made of the operation of the digital broadcast receiving apparatus of the present embodiment having the above configuration as a whole.

The high frequency broadcast radio signal 1 broadcast into space by the digital broadcast apparatus is acquired by the antenna 2 and received. The received signal S2 is supplied to the frequency conversion circuit 3. The frequency conversion circuit 3 converts the frequency of the received signal to an intermediate frequency of the difference between the frequency of the input received signal S2 and the frequency of the oscillation signal S4 of the local oscillation circuit 4. Then, the intermediate frequency signal obtained by the frequency conversion is input to the quadrature demodulation circuit 5 and quadrature demodulated.

The quadrature demodulated signal is supplied to the Fourier transform circuit 6. The related Fourier transform circuit 6 performs a Fourier transform, whereby the amplitudes and phases of the carriers of the OFDM signal contained in the received signal are demodulated together and supplied to the signal demultiplexing circuit 7.

The signal demultiplexing circuit 7 demultiplexes the information transmission use carrier, carriers of the pilot signals CP and SP, and the carrier of the transmission control signal TMCC contained in the OFDM signal demodulated by the Fourier transform circuit 6 and supplies them to the equalizing circuit 8, pilot signal error detection circuit 9, and transmission control signal decoding circuit 10.

the random sequence generation circuit 12 uses the initial value set by the control circuit 11 to generate a PRBS. The initial value for generating the related PRBS is set corresponding to the sub channel number of the received broadcast signal. The control circuit 11 in the digital broadcast receiving apparatus of the present embodiment predicts the number of the sub channel received based on the input channel selection information $S_C$ etc., determines the initial value for generating the PRBS in accordance with that, and provides it to the random sequence generation circuit 12. the random sequence generation circuit 12 generates a PRBS based on the initial value set by the control circuit 11 and supplies it to the pilot signal error detection circuit 9 and the transmission control signal decoding circuit 10.

The pilot signal error detection circuit 9 extracts the difference of the amplitudes and phases of the pilot signals demultiplexed by the signal demultiplexing circuit 7 to detect error. The signal indicating the detected error is supplied to the equalizing circuit 8. the equalizing circuit 8 corrects the distortion of the amplitude and phase of the information transmission use carrier demultiplexed by the signal demultiplexing circuit 7 based on the error of the pilot signals.

The transmission control signal decoding circuit 10 finds the reference phase of the transmission control signal TMCC based on the PRBS supplied by the random sequence generation circuit 12. the information of the transmission control signal TMCC transmitted by differentially modulating the related reference phase is decoded and supplied to the control circuit 11. the control circuit 11 generates control information, for example, a coding rate in the convolutional coding circuit and the modulation scheme used for the OFDM modulation, in accordance with the decoded transmission control signal TMCC. The control circuit 11 supplies control signals to the Viterbi decoding circuit 14 etc. based on the related control information.

The information transmission use carrier signal corrected for distortion occurring in the channel by the equalizing circuit 8 is output to the deinterleaving circuit 13. The deinterleaving circuit 13 then deinterleaves this. The result of the deinterleaving is output to the Viterbi decoding circuit 14 and Viterbi decoded. Then, the Viterbi decoded signal is outer deinterleaved by the outer deinterleaving circuit 15 and processed for energy re-dispersal at the energy re-dispersal circuit 16. the result of the processing is output to the outer decoding circuit 17, where, for example, Reed Solomon decoding is carried out. As a result of the Reed Solomon decoding, the digital information source data contained in the digital broadcast signal is restored and, for example, an audio signal etc. can be reproduced in accordance with the related restored data.

As explained above, according to the present embodiment, in the digital broadcast receiving apparatus, the initial value for generating the PRBS in the random sequence generation circuit is set in accordance with the sub channel number of the received broadcast signal, and a PRBS is generated by the random sequence generation circuit 12 based on the related initial value and supplied to the pilot signal error detection circuit 9 and the transmission control signal decoding circuit 10. the pilot signal error detection circuit 9 detects the error of carriers of the pilot signals CP and SP demultiplexed by the signal demultiplexing circuit 7 by using the PRBS and corrects the distortion of the information transmission use carrier occurring in the channel by the equalizing circuit 8 in accordance with that. The transmission control signal decoding circuit 10 detects the reference phase of the carrier of the transmission control signal TMCC by using the PRBS, decodes the transmission control signal TMCC in accordance with that, supplies the same to the control circuit 11 to generate the necessary control signals and control the reproduction of the information source data. Therefore, the information source data contained in the digital broadcast signal can be correctly reproduced and the dynamic range of the broadcast signal is kept low, so the dynamic range of for example the input side of the frequency conversion circuit can be lowered. For this reason, although not shown in FIG. 2, the dynamic range of the front end amplifier circuit such as the high frequency amplifier circuit usually connected to the output side of the antenna can be set low.

SECOND EMBODIMENT

Figure 3:
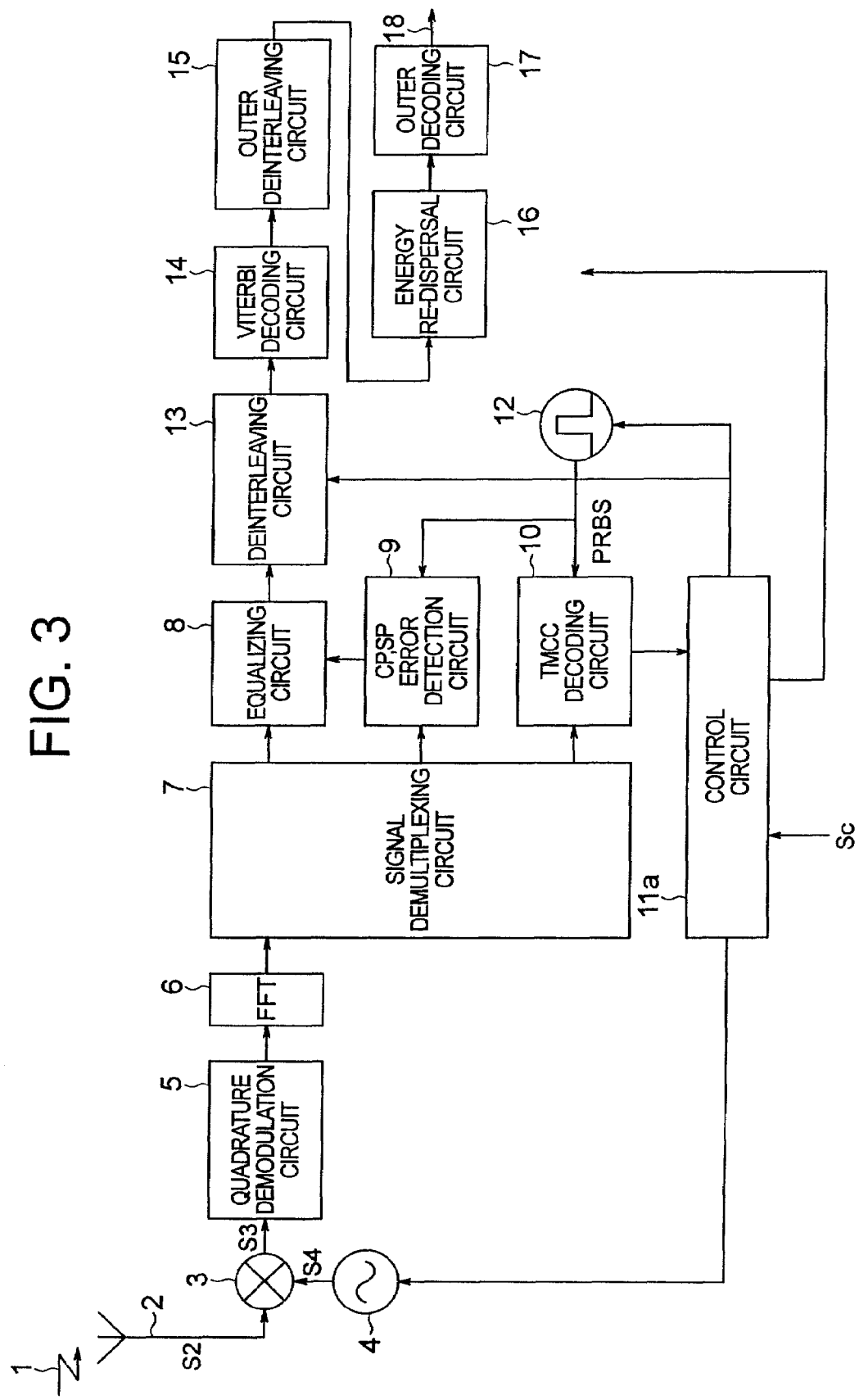
FIG. 3 is a circuit diagram of a second embodiment of a digital broadcast receiving apparatus according to the present invention.

FIG. 3 is a circuit diagram of a second embodiment of a digital broadcast receiving apparatus according to the present invention. As illustrated, the receiving apparatus of the present embodiment has substantially the same configuration as that of the receiving apparatus of the first embodiment and is substantially the same as the first embodiment except that the deinterleaving circuit 13a sets the parameter in the deinterleaving under the control of the control circuit 11b, so components the same as those of the first embodiment are represented by the same references.

In the present embodiment, the deinterleaving circuit 13a sets the parameter in accordance with a control signal from the control circuit 11a and deinterleaves by using the set parameter. On the digital broadcast side, as the method of reducing the dynamic range of the broadcast signal, other than the control of the initial value for generating the PRBS in the mapping of the pilot signals CP and SC, transmission control signal TMCC, etc. corresponding to the frequency of the broadcast channel, for example, the sub channel signal, the parameter in the frequency interleaving is set in accordance with the frequency of the broadcast channel, for example, the sub channel number. For this reason, except for having the receiving side set the initial value for generating the PRBS to be supplied to the pilot signal error detection circuit 9 and the transmission control signal decoding circuit 10 in accordance with for example the number of the sub channel similar to the broadcast side as in the first embodiment explained above, in the present embodiment, the parameter of the deinterleaving in the deinterleaving circuit 13 is controlled in accordance with the number of the sub channel.

Specifically, for example, the control circuit 11a receives the reception control signal $S_C$ indicating the number of the channel and sub channel to be received, generates a control signal for generating the parameter necessary for the deinterleaving in accordance with the indicated sub channel number, and supplies the same to the deinterleaving circuit 13a. For this reason, in the deinterleaving circuit 13, by setting the parameter in accordance with the control signal, the same parameter will be used for the interleaving on the transmission side of the digital broadcast and the deinterleaving on the reception side, and thus the broadcast signal can be correctly restored and reproduced.

The partial circuits other than the deinterleaving circuit 13a have substantially the same configurations and functions as those of the corresponding partial circuits of the first embodiment, so detailed explanations of them will be omitted.

Note that, in the present embodiment, the control circuit 11a controls the initial value for generating the PRBS in the random sequence generation circuit 12 in accordance with the processing on the broadcast side. For example, on the broadcast side, when mapping the pilot signals CP and SP, transmission control signal TMCC, etc., when the initial value for generating the PRBS is set in accordance with the broadcast use frequency, for example sub channel number, in the receiving apparatus of the present embodiment, in the same way as the broadcast side, for example the PRBS generation use initial value in the random sequence generation circuit 12 is set by the control circuit 11 in accordance with the received sub channel number. The generated PRBS is supplied to the pilot signal error detection circuit 9 and the transmission control signal decoding circuit 10, the amplitudes and phase errors of the pilot signals CP and SP are detected in accordance with the related PRBS and supplied to the equalizing circuit 8, the reference phase of the transmission control signal TMCC is detected based on the related PRBS, and the transmission control signal TMCC is decoded in accordance with this. The distortion of the information transmission use carrier occurring in the channel is corrected in accordance with the error of the pilot signals detected at the related circuit 9. Also, the control signals necessary for partial circuits are supplied in accordance with the transmission control signal TMCC decoded at the control circuit 11a.

THIRD EMBODIMENT

Figure 4:
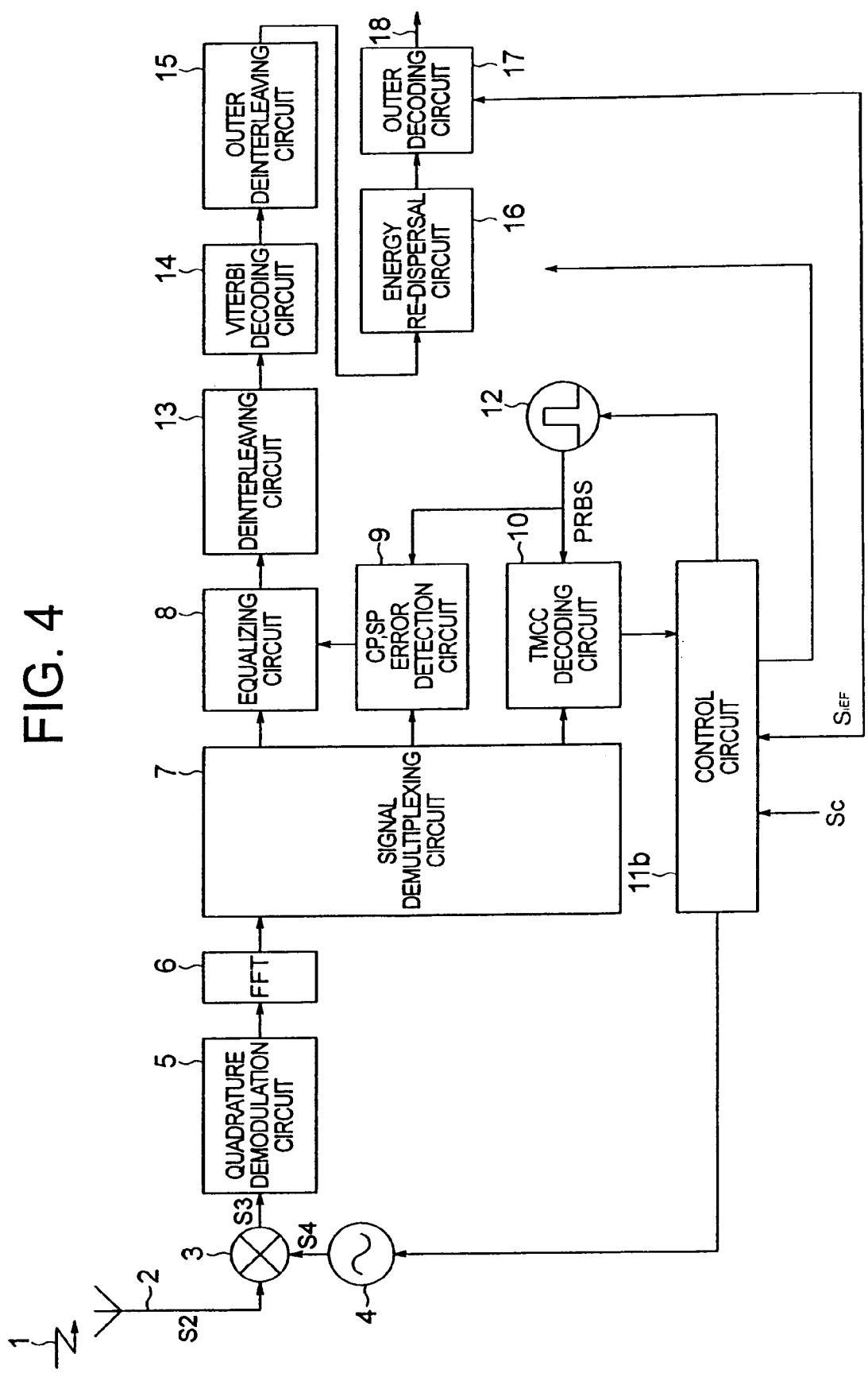
FIG. 4 is a circuit diagram of a third embodiment of a digital broadcast receiving apparatus according to the present invention.
Figure 5:
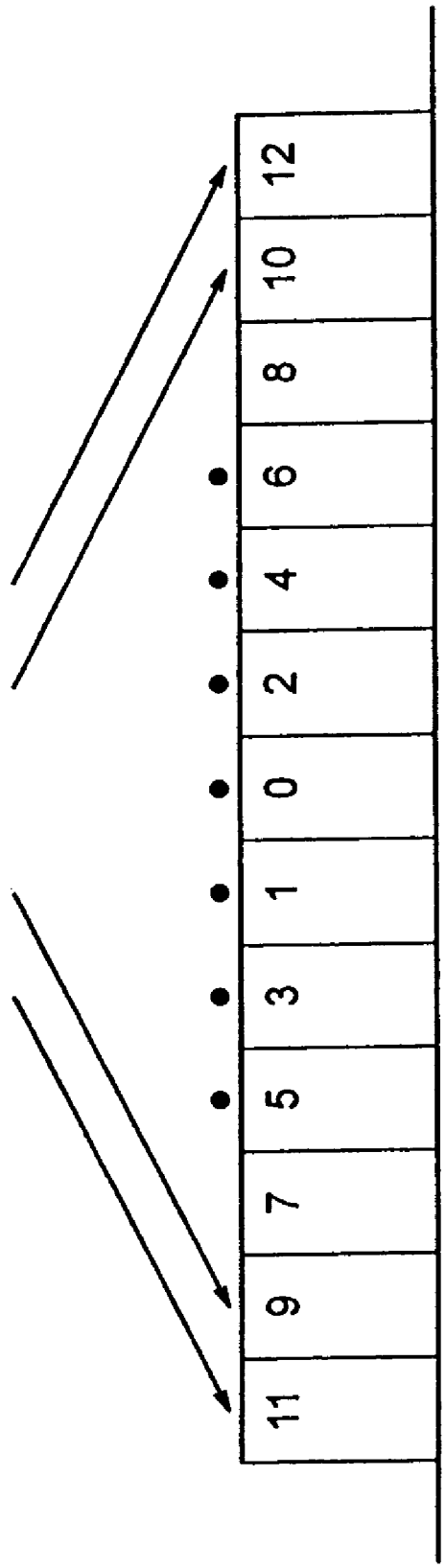
FIG. 5 is a view of a segment structure in the wideband ISDB-T broadcast system and phases of pilot signals etc. in a segment.

FIG. 4 is a circuit diagram of a third embodiment of a digital broadcast receiving apparatus according to the present invention. As illustrated, the receiving apparatus of the present embodiment has substantially the same configuration as the receiving apparatus of the first embodiment except for the control circuit 11b. the control circuit 11b in the receiving apparatus of the present embodiment is supplied with an error flag $S_{EF}$ from an outer decoding circuit 17a as shown in FIG. 4 other than the transmission control signal TMCC decoded by the transmission control signal decoding circuit 10 and the reception control signal $S_C$ input from the outside. the control circuit 11b controls the automatic channel selection or preset operation in accordance with the related error flag $S_{EF}$.

The partial circuits other than that mentioned above have substantially the same configurations and functions as those of the corresponding circuits of the first embodiment shown in FIG. 2, so an explanation will be made below of the automatic channel selection or preset operation of the digital broadcast receiving apparatus of the present embodiment with reference to the configurations of the outer decoding circuit 17a and control circuit 11b in the present embodiment.

The outer decoding circuit 17a decodes the output signal of the energy dispersal circuit 16 by for example Reed Solomon decoding. When error existing in the input data series is corrected by the related decoding and the original information source data can be correctly restored, the restored information source data 18 is output and an audio signal etc. can be reproduced in accordance with that. On the other hand, sometimes the error cannot be corrected and the information source data cannot be correctly restored due to for example transmission conditions of the channel. For example, where interference, noise, etc. in the channel is strong, an S/N ratio of the received signal becomes low. When the S/N ratio deteriorates to less than a predetermined level, the original information source data cannot be correctly reproduced. At this time, for example, the outer decoding circuit 17a can no longer correct error as a result of the Reed Solomon decoding. An error flag $S_{EF}$ is generated from the outer decoding circuit 17a and supplied to the control circuit 11b.

In the automatic channel selection or preset operation, the receiving apparatus selects the channel while sequentially searching for the sub channels of the channel being actually broadcast. These operations are controlled by the control circuit 11b. For example, the control circuit 11b controls the oscillation frequency of the local oscillation circuit 4 so as to sequentially receive upper or lower sub channels from among sub channels of channels being received at present and sets the initial value for generating the PRBS in the random sequence generation circuit 12. At this time, if the error can be correctly corrected through the deinterleaving circuit 13 etc. and the original information source data can be restored after the information transmission use carrier signal demultiplexed by the signal demultiplexing circuit 7 is corrected for distortion by the equalizing circuit 8, the outer decoding circuit 17a does not generate the error flag $S_{EF}$. On the other hand, if the received signal is weak due to the sub channel not performing the broadcast or some other cause and the original information source data cannot be correctly restored, the error cannot be correctly corrected in the outer decoding circuit 17a, and the error flag $S_{EF}$ is generated. Upon receipt of the error flag $S_{EF}$, the control circuit 11b terminates the reception of the related sub channel and starts the operation for reception of the next sub channel.

In the automatic channel selection operation, the control circuit 11b sequentially checks the sub channels on the upper or lower side of the present sub channel until the error flag $S_{EF}$ is no longer output from the outer decoding circuit 17a. When finding the sub channel being broadcast, the control circuit 11b generates a predetermined control signal so that the sub channel is continuously received and outputs the same to the partial circuits.

Also, at the preset, the control circuit 11b controls the system so that all channels and sub channels are sequentially received and checks for the error flag $S_{EF}$ from the outer decoding circuit 17a when receiving each sub channel. For a sub channel for which the error flag $S_{EF}$ is not output, it judges that the sub channel is being broadcast, that the information source data can be correctly restored based on the broadcast signal thereof, and that the audio signal can be reproduced and stores the information relating to the sub channel in for example a built-in memory. Conversely, for a sub channel for which the error flag $S_{EF}$ is output, it judges that the related channel is not being broadcast at present or the state of reception of the broadcast signal is poor and that the information source data cannot be correctly reproduced and therefore does not preset the related sub channel.

As explained above, the receiving apparatus of the present embodiment generates the error flag $S_{EF}$ in accordance with whether or not the outer decoding circuit 17a can correct error. The control circuit 11b can select channels or preset sub channels of the reception channel based on existence of the error flag $S_{EF}$ from the outer decoding circuit 17a.

In Japan, the current television channels are determined so that the frequency bands of a seventh channel and an eighth channel partially overlap. Despite that fact that there is only a single sub channel in the overlapping band, a sub channel number as seen from the viewpoint of the seventh channel and a sub channel number as seen from the viewpoint of the eighth channel are assigned. Accordingly, the control with respect to the local oscillation circuit 4 is identical for the case of selecting this overlapping band as the seventh channel and the case of selecting this as the eighth channel, but the initial values for generating the PRBS become different. This means that if the channel is perceived differently by the transmission side and reception side (that is, the user selecting the channel), the signal cannot be correctly received. In actuality, since these sub channels are identical in frequency, so there is a possibility that a signal processed as a sub channel of the seventh channel on the transmission side will be selected as a sub channel of the eighth channel on the user side. In this case, the initial value for generating the PRBS is not correctly generated, so it becomes impossible to correctly receive the signal. In order so solve such a problem, in the present embodiment, the control circuit 11b controls the random sequence generation circuit 12 treating this overlapping band as the sub channel for the seventh channel and for the eighth channel when receiving it.

In this case, the control circuit 11b first for example sets the initial value for the random sequence generation circuit 12 in accordance with the sub channel number of the seventh channel. When it can correct receive the signal by the set initial value and no error flag $S_{EF}$ is output from the outer decoding circuit 17a, it can recognize that the sub channel being broadcast at present belongs to the seventh channel. On the other hand, when an error flag $S_{EF}$ is output from the outer decoding circuit 17a, the control circuit 11b resets the initial value for the random sequence generation circuit 12 in accordance with the sub channel number of the eighth channel. Based on this, channel selection, automatic channel selection, and preset of the reception channels become possible for the sub channels of the seventh and eighth channels overlapping in bands.

As explained above, according to the present embodiment, the error flag $S_{EF}$ is generated and supplied to the control circuit 11b when the outer decoding circuit 17a cannot correct error. The control circuit 11b can determine whether the sub channel to be received is being broadcast or whether the original information source data can be correctly restored based on the received signal by checking for existence of the error flag $S_{EF}$ when receiving the sub channel of the predetermined channel, so can perform the automatic channel selection and preset of the reception channel. Also, when sub channels of the seventh and eighth channels which are established with overlapping frequency bands are received, the control circuit 11b outputs the same control signal to the local oscillation circuit 4 to set PRBS generation use initial values corresponding to both of these sub channels in the random sequence generation circuit 12. By this, it can recognize the sub channels in the overlapping channels and can perform the channel selection, automatic channel selection, or preset of the reception channels.

Capability of Utilization in Industry

As explained above, according to the digital broadcast receiving apparatus of the present invention, by setting an initial value of a random sequence for decoding the control signal of the channel pilot signals etc. corresponding to the broadcast use frequency of the digital broadcast signal, for example, the sub channel of for example the broadcast channel, it is possible to detect error occurring in the channel by the signal for controlling the pilot signals etc. and to correct distortion of the received information transmission use carrier in accordance with that. Also, by controlling the parameter in the deinterleaving corresponding to the broadcast use frequency, for example the sub channel of the broadcast channel, the information source data can be correctly reproduced.

Further, by controlling the partial circuits of the receiving apparatus based on the information obtained by decoding the transmission control signal, there is an advantage that the receiving apparatus can achieve stable operation and high precision signal restoration and signal reproduction.

We claim:

1. A digital broadcast receiving apparatus for receiving a broadcast signal generated by combining sub signals modulated using a PRBS (pseudo-random binary sequence) generated based on an initial value set in accordance with a frequency of a broadcast channel by a signal transmission control use signal and a main signal generated based on information source data and reproducing the information source data contained in the received broadcast signal, having
   a demultiplexing circuit for demultiplexing said main signal and sub signals in the received broadcast signal,
   a random sequence generating circuit for generating said PRBS based on the initial value set in accordance with the frequency of said broadcast channel,
   a sub signal reproduction circuit for reproducing said demultiplexed sub signals using said PRBS,
   a control circuit for controlling one or more of (i) a coding rate, which is a ratio of decoded bits of the main signal to corresponding encoded bits of the main signal, and (ii) a modulation scheme of the reproduction of said main signal in accordance with said reproduced demultiplexed sub signals, and
   a decoding circuit for decoding said main signal under the control of said control circuit.

2. A digital broadcast receiving apparatus as set forth in claim 1, wherein said broadcast signal is an OFDM (orthogonal frequency division multiplexing) modulated signal obtained by OFDM modulating said main signal and sub signals.

3. A digital broadcast receiving apparatus as set forth in claim 1, wherein said information source data is sound data obtained by encoding a sound signal.

4. A digital broadcast receiving apparatus as set forth in claim 1, wherein
   pilot signals are contained in said sub signals, and further having
   a correction circuit for correcting a distortion occurring in said main signal in accordance with a difference of said pilot signals detected by using said PRBS.

5. A digital broadcast receiving apparatus as set forth in claim 1, wherein
   a transmission control signal is contained in said sub signals, and
   said control circuit controls the decoding operation of said decoding circuit in accordance with said transmission control signal reproduced by using said PRBS.

6. A digital broadcast receiving apparatus as set forth in claim 1, wherein
   the sub signals are modulated using the PRBS generated based on the initial value set in accordance with a sub channel number at a broadcasting side, and
   the control circuit sets an initial value for generating the PRBS in accordance with the sub channel number.

7. A digital broadcast receiving apparatus as set forth in claim 1, wherein said decoding circuit outputs an error signal when an error correction becomes disabled in accordance with a state of the received broadcast signal.

8. A digital broadcast receiving apparatus as set forth in claim 7, wherein said received broadcast signal is transmitted using a bandwidth of the frequency of the broadcast channel overlapping that of another channel and the initial value is changed based on a sub channel number of the other channel.

9. A digital broadcast receiving apparatus for receiving a broadcast signal generated by combining a main signal comprising a data series generated in accordance with information source data interleaved and encoded using a parameter set in accordance with a frequency of a broadcast channel and sub signals comprising a transmission control signal modulated using a predetermined random sequence generated based on an initial value set in accordance with a sub channel number at a transmission side, and for reproducing said information source data contained in the received broadcast signal, the transmission control signal comprising control information, the apparatus comprising:
a demultiplexing circuit for demultiplexing said main signal and sub signals in the received broadcast signal;
a random sequence generating circuit for generating the predetermined random sequence based on the initial value set in accordance with the sub channel number;
a sub signal reproduction circuit for reproducing the sub signals based on the predetermined random sequence;
a deinterleaving circuit for deinterleaving said demultiplexed main signal using the parameter set in accordance with the frequency of said broadcast channel; and
a decoding circuit for decoding the deinterleaved main signal according to the control information.

10. A digital broadcast receiving apparatus as set forth in claim 9, wherein
the parameter used for the interleaving on a transmission side is set in accordance with the broadcast channel, and
further having a control circuit for setting said parameter in said deinterleaving circuit in accordance with the received broadcast channel.

11. A digital broadcast receiving apparatus as set forth in claim 9, wherein the predetermined random sequence comprises a PRBS (pseudo-random binary sequence) generated based on the initial value set in accordance with the sub channel number at the transmission side.

12. A digital broadcast receiving apparatus as set forth in claim 9, wherein said broadcast signal is an OFDM modulated wave.

13. A digital broadcast receiving apparatus as set forth in claim 9, wherein said information source data is sound data obtained by encoding a sound signal.

14. A digital broadcast receiving apparatus as set forth in claim 9, wherein
pilot signals are contained in said sub signals, and further having
a correction circuit for correcting a distortion occurring in said main signal in accordance with a difference of said pilot signals detected by using a PRBS (pseudo-random binary sequence).

15. A digital broadcast receiving apparatus as set forth in claim 9, wherein said control circuit controls the operation of said decoding circuit in accordance with said transmission control signal reproduced by using said predetermined random sequence.

16. A digital broadcast receiving apparatus for receiving a broadcast signal generated by combining sub signals modulated using a PRBS (pseudo-random binary sequence) generated based on an initial value set in accordance with a frequency of a broadcast channel by a signal transmission control use signal and a main signal generated based on information source data and reproducing the information source data contained in the received broadcast signal, having
a demultiplexing circuit for demultiplexing said main signal and sub signals in the received broadcast signal,
a random sequence generating circuit for generating said PRBS based on the initial value set in accordance with the frequency of said broadcast channel,
a sub signal reproduction circuit for reproducing said demultiplexed sub signals using said PRBS,
a control circuit for controlling the reproduction of said main signal in accordance with said reproduced demultiplexed sub signals, and
a decoding circuit for decoding said main signal under the control of said control circuit and outputting an error signal when an error correction becomes disabled in accordance with a state of the received broadcast signal,
wherein the received broadcast signal is transmitted using a bandwidth of the frequency of the broadcast channel overlapping that of another channel and the initial value is changed based on a sub channel number of the other channel.

* * * * *